June 14, 1949.  O. A. TYSON  2,473,457
POTENTIAL COMPARATOR
Filed Aug. 1, 1945

INVENTOR
OWEN A. TYSON
BY
William D. Hall
ATTORNEY

UNITED STATES PATENT OFFICE 2,473,457

POTENTIAL COMPARATOR

Owen A. Tyson, Cambridge, Mass., assignor, by mesne assignments, to the United States of America as represented by the Secretary of War Application August 1, 1945, Serial No. 608,314

1 Claim. (Cl. 250—27)

This invention relates to electrical circuits and more particularly to circuits for producing alternating voltage from a direct-current signal.

In many electronic applications it is desirable to produce an alternating-current signal that is proportional to the amplitude of a direct-current signal. Many times this is done to avoid having to amplify the direct-current signal since it is more feasible to amplify alternating current than direct current. It is also desirable in some applications to produce a signal proportional to the difference between two direct-current potentials. This type of circuit is usually known as a D.-C. comparator circuit.

It is an object of the present invention, therefore, to provide a circuit for producing an alternating-current signal proportional to the difference of two direct-current potentials.

A further object of this invention is to provide a circuit for producing an alternating-current signal as a function of the polarity and amplitude of a direct-current signal.

In accordance with the present invention there is provided a plurality of amplifiers with means for applying a plurality of signals to at least two of said amplifiers. Means are provided for comparing the outputs of at least two of said amplifiers in such a manner that a signal is obtained which is proportional to the relative amplitudes of two of the input signals.

For a better understanding of the invention, together with other and further objects thereof, reference is had to the following description taken in connection with the accompanying drawing in which.

Figure 1:
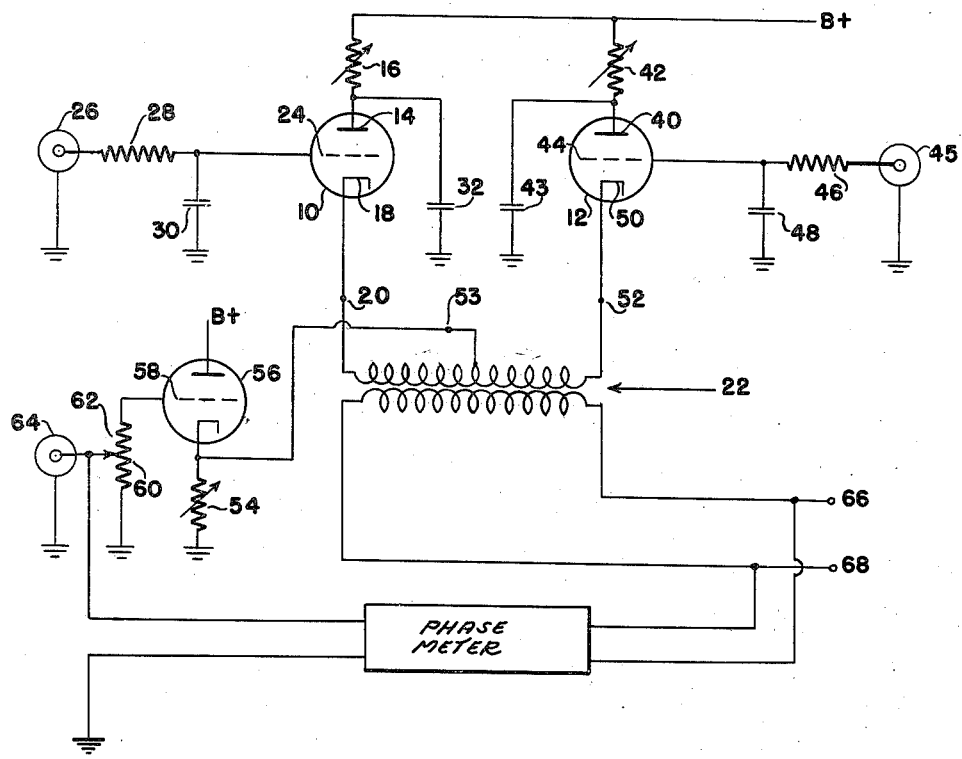
Fig. 1 is a schematic diagram of the invention.

This invention employs two identical triode vacuum tubes 10 and 12 as comparator tubes. Tubes 10 and 12 are connected in identical circuits. The anode 14 of tube 10 is connected to a suitable source of plate potential through a variable resistor 16. The cathode 18 of tube 10 is connected to a terminal 20 on the primary of a transformer 22. The control grid 24 of tube 10 is connected to a signal input 26 through a low-pass filter composed of resistor 28 and capacitor 30. A capacitor 32 is connected from anode 14 to ground.

In a similar manner the anode 40 of tube 12 is connected to a suitable source of plate potential through a variable resistor 42. Anode 40 is also connected to ground by a capacitor 43. The control grid 44 of tube 12 is connected to a signal input 45 through a low-pass filter composed of resistor 46 and capacitor 48. Cathode 50 of tube 12 is connected to a second terminal 52 on the primary of transformer 22. A center tap 53 on the primary of transformer 22 is connected to ground through a variable resistor 54. Resistor 54 is part of a cathode follower circuit that also includes vacuum tube 56. The control grid 58 of tube 56 is connected to ground through resistor 60. A variable tap 62 on resistor 60 is connected to signal input 64. The two terminals 66 and 68 on the secondary of transformer 22 serve as output terminals for this circuit.

If this circuit is to be used as a D.-C. voltage comparator, the two signals to be compared are applied at signal inputs 26 and 45. A constant amplitude sine wave signal is applied to the grid 58 of the cathode follower circuit including tube 56. A sine wave signal of somewhat reduced amplitude will appear at the cathode of tube 56. This signal is applied to the cathode 18 of tube 10 through one-half of the primary of transformer 22. A sine wave signal of equal amplitude is applied to cathode 50, tube 12, through the other half of the primary of transformer 22.

If the control grids 24 and 44 of tubes 10 and 12 are at the same potential, the transconductance of the two tubes will be equal since the two tubes have identical characteristics. Since equal signals are applied to the two tubes, the alternating components of the plate current in two tubes are equal. The plate currents from tubes 10 and 12 flow in opposite directions through the primary of transformer 22, therefore, no voltage will be induced in the secondary of this transformer when the alternating components of the two plate currents are equal. The conclusion is, therefore, that when the potentials applied at signal inputs 26 and 45 are equal, no signal will appear at terminals 66 and 68.

Suppose now that the potential at signal input 26 is at a higher potential than the potential at signal input 45. The control grid 24 of tube 10 will now be at a higher potential than the control grid 44 of tube 12 and the dynamic transconductance of tube 10 will be greater than the dynamic transconductance of tube 12. With equal sine wave signals applied to the cathode of each tube the alternating component of the plate current through tube 10 will be greater than the alternating component of the plate current through tube 12. These unequal components of current will cause an alternating magnetic flux to be set up in the primary of the transformer 22 and a sine wave signal will appear at terminals 66 and 68 on the secondary of transformer 22. This signal is illustrated as curve 70 of Figs. 2 and 3.

Figure 2:
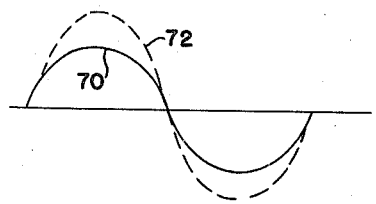
Fig. 2 is a plot of the output signals of Fig. 1 as the input signals are varied.
Figure 3:
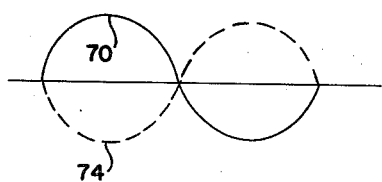
Fig. 3 is a second plot of the output signals with a different variation in the input signals.

If the potential of signal input 26 is made still higher than that of signal input 45, the transconductance of tube 10 will still further increase, and the amplitude of the signal at points 66 and 68 will increase as shown by curve 72 of Fig. 2.

If, however, signal input 45 is made higher in potential than signal input 26, the transconductance of tube 12 under these conditions is greater than the transconductance of tube 10. The amplitude of the alternating component of plate current through the portion of the primary of transformer 22 between terminals 52 and center tap 53 is greater than the alternating component of plate current through the portion of the primary between terminal 20 and center tap 53. The phase of the voltage induced in the secondary of transformer 22 is the exact opposite of the phase of the voltage induced when signal input 26 is at a higher potential than signal input 45. Therefore the phase of the alternating voltage across the output terminals 66 and 68 with respect to the input alternating voltage indicates which of the potentials at the inputs 26 or 45 is higher. The phase relations are illustrated by the alternating voltage input curves 70 of Figs. 2 and 3 and the output curves 72 and 74 that corresponds to the two possible phase relations obtained at output terminals 66 and 68. This phase relation can be measured by any phase sensitive means. The amplitude of the signal at points 66 and 68 is indicative of the magnitude of the difference in potential between the two signal inputs 26 and 45.

While it has been stated that tubes 10 and 12 have identical characteristics, it is recognized that it is difficult to select two tubes with exactly identical characteristics so the variable resistors 16 and 42 are provided to compensate for minor differences and characteristics in tubes 10 and 12. The values of these resistors do not affect the alternating component of plate current through tubes 10 and 12 since the anodes of tubes 10 and 12 are maintained at a fixed potential for alternating current by capacitors 32 and 40. The signals that are applied at signal inputs 26 and 45 are supposedly pure direct current signals but it is possible that these signals may have an alternating-current ripple superimposed upon them due to pick-up or some other similar reason. This ripple would cause inaccurate operation of the circuit so signal inputs 26 and 45 are connected to grids 24 and 44 respectively through low pass filter circuits that are designed to prevent any alternating current signals from reaching grids 24 and 44. If this circuit is to be used to produce an alternating current voltage proportional to a direct current potential, one of the signal inputs, for example, signal input 45, is maintained at a fixed potential and the direct current signal is applied at point 26. With a constant amplitude sine wave signal applied at grid 58 of tube 56 the signal at terminals 66 and 68 will be a sine wave voltage whose amplitude is proportional to the amplitude of the signal applied at signal input 26.

The advantages of this circuit as have been pointed out in the above description are that this circuit may be used to compare the amplitudes of two direct-current potentials. Also the circuit may be used to produce an alternating voltage proportional to a direct voltage, thus eliminating the necessity of providing direct-current amplifiers in many applications.

While there has been described what is at present considered the preferred embodiment of the invention, it will be obvious to those skilled in the art that various changes and modifications may be made therein without departing from the invention.

What is claimed is:

A circuit for comparing the amplitudes of two direct-current potentials comprising a first, a second and a third vacuum tube, each having at least a cathode, an anode and a control grid, means for connecting said first vacuum tube as a cathode follower, first and second variable resistors for connecting said anodes of said second and third vacuum tubes to a suitable source of plate potential, said first and second variable resistors providing means for balancing said circuit, first and second capacitor means for maintaining said anodes of said second and third vacuum tubes at a substantially constant potential for alternating voltage signals, a transformer having a first, a second and a third primary terminal and a first and a second secondary terminal, said two secondary terminals serving as the output terminals for said comparator circuit, means for connecting said cathodes of said first, second and third vacuum tubes to said first, second and third primary terminals of said transformer, means for introducing a first and second direct-current potential, low-pass filter means for applying said first and second direct-current potentials to the control grids of said second and third vacuum tubes respectively, and means for applying a sine wave signal to the control grid of said first vacuum tube.

OWEN A. TYSON.

REFERENCES CITED

The following references are of record in the file of this patent:

UNITED STATES PATENTS

| Number | Name | Date |
|---|---|---|
| 1,586,533 | Peterson | June 1, 1926 |
| 2,129,880 | Scherbatskoy | Sept. 13, 1938 |
| 2,140,662 | Zuschlag | Dec. 20, 1938 |
| 2,179,265 | Luck | Nov. 7, 1939 |
| 2,183,399 | Heising | Dec. 12, 1939 |
| 2,366,603 | Dehmel | Jan. 2, 1945 |
| 2,391,532 | Wilmotte | Dec. 25, 1945 |
| 2,397,540 | Dome | Apr. 2, 1946 |